(No Model.)
T. C. CHURCHMAN.
Harness.
No. 234,701. Patented Nov. 23, 1880.
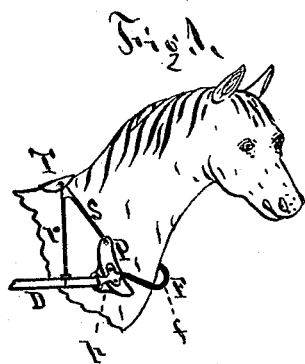
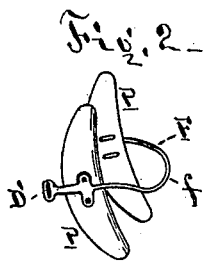
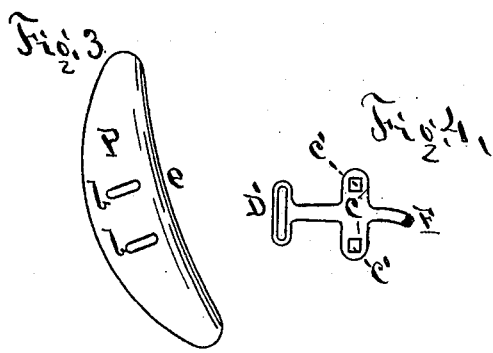
Witnesses,
William S. Johnston.
Clarence L. Healy
Inventor,
Thomas C. Churchman,
per Atty.
A. S. Waterhouse

UNITED STATES PATENT OFFICE.

THOMAS C. CHURCHMAN, OF SACRAMENTO, CALIFORNIA.

HARNESS.

SPECIFICATION forming part of Letters Patent No. 234,701, dated November 23, 1880.

Application filed May 15, 1880. (No model.)

*To all whom it may concern:*

Be it known that I, THOMAS C. CHURCHMAN, of the city of Sacramento, State of California, have invented a new and useful Improvement in Harness, of which the following is a full, clear, and exact description.

The invention relates to an improvement in what is known as a "front iron," that serves in the place of a breast-strap or collar; and it consists in an improved form of constructing the front iron and in the manner of connecting the same to the padded plate used in combination with said front iron, so that said plates will be adjustable.

By reference to the accompanying drawings, in which like letters refer to like parts, Figure 1 shows the front portion of a horse with the part of the harness on embodied in my invention. Fig. 2 is a view of the front iron F and plates P, and Fig. 3 is a detail of one of the plates P. Fig. 4 is a section of one end of the front iron, F.

The front iron F is formed bow-like, so that the part $f$ will extend forward and around the chest or lower portion of the horse's neck, and by extending forward will prevent the horse from pressing against it and causing the pull of the horse to be entirely expended against the plates P, which are well padded underneath and held in proper position on the horse's shoulders by the strap S, (see Fig. 1,) which strap S, together with the strap $r$, which supports the tug D, are both connected to the top pad, T, resting on the horse's withers.

By reference to Fig. 2 will be seen a view of the plates P and the front iron F, the part $f$ bowing around, so as to stand off from the horse's chest.

The ends of the front iron F, at D', are provided with slots to receive the tug-straps, and by reference to Fig. 4 will be seen a section or one end of the front iron F, with the tug-slot D' and the cross-clips $c\ c$ made a part of the front iron F, with bolt-holes $c'\ c'$ to receive the bolts that secure the plates P to the iron F. The holes $c'$ are made square to keep the bolts from turning, or, if desired, these holes may be made slotted in order to allow the plates P to be adjusted.

Fig. 3 shows a detail of one of the plates P, which are turned upon the edge $e$ so as to fit the shoulders of the horse, and are provided with the two slotted bolt-holes $b\ b$, made slotted for the purpose of allowing the plates to be slid in or out on the bolts that secure them to the iron F, so as to adapt them to be adjusted to the size or shape of the horse upon which the article is placed; and when properly adjusted the bolts (not shown) that pass through the holes $c'$ in the front iron F, and the slots $b$ in the plates P, being provided with suitable heads and nuts, can be tightly screwed together and the whole rigidly connected. The plates are provided with suitable pads. (Not shown, except by $p$, Fig. 1.)

Instead of making the plates adjustable by means of the slotted bolt-holes $b\ b$, any other equivalent means may be employed, or in case it is desirable to have the plates P rigidly connected to or made a part of the front iron F, and still be made adjustable, it can be done by making the iron F at $f$ in two parts, and make the parts slide past each other, and then be connected or secured by proper screws or clamps, thus allowing the distance between the plates P to be changed by extending the length of the iron F at $f$.

The advantages of this form of pulling-gear for harnesses over the horse-collar or breast-strap now in use are that it can be adjusted to fit any horse, is light, strong, and simple, and does not gall the horse or press upon his chest or neck in a way tending to choke him, as in the case of the collar or breast-strap.

What I claim as my invention is—

The bent front iron, F, provided with the tug-slots D' and cross-clips $c\ c$, provided with bolt-holes $c'\ c'$, in combination with the plates P, provided with slotted holes $b\ b$, substantially as and for the purposes shown and described.

THOMAS C. CHURCHMAN.

Witnesses:
WILLIAM S. JOHNSTON,
CLARENCE L. HEALY.